(12) United States Patent
Bolton et al.

(10) Patent No.: US 8,831,999 B2
(45) Date of Patent: Sep. 9, 2014

(54) ASYNCHRONOUS VIDEO INTERVIEW SYSTEM

(71) Applicant: CollegeNET, Inc., Portland, OR (US)

(72) Inventors: Jeff M. Bolton, Portland, OR (US); James H. Wolfston, Jr., West Linn, OR (US)

(73) Assignee: CollegeNET, Inc., Portland, OR (US)

( * ) Notice: Subject to any disclaimer, the term of this patent is extended or adjusted under 35 U.S.C. 154(b) by 0 days.

(21) Appl. No.: 13/775,096

(22) Filed: Feb. 22, 2013

(65) Prior Publication Data

US 2013/0226578 A1 Aug. 29, 2013

Related U.S. Application Data

(60) Provisional application No. 61/602,566, filed on Feb. 23, 2012.

(51) Int. Cl.
| | |
|---|---|
| G06Q 10/00 | (2012.01) |
| H04L 12/18 | (2006.01) |
| G10L 15/26 | (2006.01) |
| G10L 15/22 | (2006.01) |
| H04N 7/14 | (2006.01) |
| G06Q 10/10 | (2012.01) |
| G10L 25/63 | (2013.01) |

(52) U.S. Cl.
CPC ............ *H04N 7/141* (2013.01); *H04L 12/1818* (2013.01); *G10L 15/26* (2013.01); *G10L 15/22* (2013.01); *H04N 7/147* (2013.01); *G06Q 10/1053* (2013.01); *G10L 15/265* (2013.01); *G10L 25/63* (2013.01)
USPC .......................................... 705/321; 705/320

(58) Field of Classification Search
CPC ............ G06Q 10/105; G06Q 10/1053; G06Q 10/1057

USPC .................................................. 705/320–321
See application file for complete search history.

(56) References Cited

U.S. PATENT DOCUMENTS

| | | | |
|---|---|---|---|
| 7,644,350 | B2 | 1/2010 | Piersol |
| 7,921,091 | B2 | 4/2011 | Cox |

(Continued)

FOREIGN PATENT DOCUMENTS

| | | |
|---|---|---|
| EP | 1 598 760 A1 | 11/2005 |
| KR | 10 2002 0026048 A | 4/2002 |

(Continued)

OTHER PUBLICATIONS

Morrison et al., "Ensemble Methods for Spoken Emotion Recognition in Call-Centers", Speech Communication, vol. 49, Issue 2, Feb. 2007.*

(Continued)

*Primary Examiner* — Samuel G Neway
(74) *Attorney, Agent, or Firm* — Christensen O'Connor Johnson & Kindness PLLC

(57) ABSTRACT

Aspects of an asynchronous video interview system and related techniques include a server that receives a plurality of pre-recorded video prompts, generates an interview script, transmits a video prompt from the interview script to be displayed at a client computing device, and receives a streamed video response from the client computing device. The server can perform algorithmic analysis on content of the video response. In another aspect, a server obtains response preference data indicating a timing parameter for a response. In another aspect, a video prompt and an information supplement (e.g., a news item) that relates to the content of the video prompt are transmitted. In another aspect, a server automatically selects a video prompt (e.g., a follow-up question) to be displayed at the client computing device (e.g., based on a response or information about an interviewee).

20 Claims, 16 Drawing Sheets

(56) References Cited

U.S. PATENT DOCUMENTS

| | | | |
|---|---|---|---|
| 8,266,068 B1* | 9/2012 | Foss et al. | 705/321 |
| 2002/0040317 A1 | 4/2002 | Neumeyer | |
| 2002/0116716 A1 | 8/2002 | Sideman | |
| 2002/0143573 A1 | 10/2002 | Bryce | |
| 2002/0169631 A1* | 11/2002 | Lewis | 705/1 |
| 2003/0125610 A1* | 7/2003 | Sachs et al. | 600/300 |
| 2004/0019648 A1 | 1/2004 | Huynh | |
| 2004/0093263 A1* | 5/2004 | Doraisamy et al. | 705/11 |
| 2004/0186743 A1* | 9/2004 | Cordero, Jr. | 705/1 |
| 2005/0060175 A1* | 3/2005 | Farber et al. | 705/1 |
| 2005/0137896 A1* | 6/2005 | Pentecost et al. | 705/1 |
| 2006/0136375 A1 | 6/2006 | Cox | |
| 2007/0088601 A1* | 4/2007 | Money et al. | 705/10 |
| 2007/0185723 A1* | 8/2007 | Shellnutt | 705/1 |
| 2008/0059290 A1* | 3/2008 | McFaul | 705/11 |
| 2008/0086504 A1* | 4/2008 | Sanders et al. | 707/104.1 |
| 2008/0112315 A1 | 5/2008 | Hu | |
| 2008/0228777 A1 | 9/2008 | Sawant | |
| 2008/0270467 A1* | 10/2008 | Clarke | 707/104.1 |
| 2009/0037201 A1* | 2/2009 | Cravens | 705/1 |
| 2009/0094652 A1 | 4/2009 | Al Adham | |
| 2009/0228323 A1* | 9/2009 | Ebrahimian | 705/9 |
| 2009/0286219 A1* | 11/2009 | Kisin et al. | 434/362 |
| 2010/0088585 A1 | 4/2010 | Piersol | |
| 2010/0114791 A1* | 5/2010 | Gold et al. | 705/347 |
| 2010/0161635 A1 | 6/2010 | Dey | |
| 2011/0088081 A1* | 4/2011 | Folkesson et al. | 726/5 |
| 2011/0208665 A1* | 8/2011 | Hirsch et al. | 705/321 |
| 2012/0072961 A1 | 3/2012 | Marignan | |
| 2012/0109837 A1* | 5/2012 | Sahagun et al. | 705/321 |
| 2012/0221477 A1* | 8/2012 | Pande | 705/321 |
| 2012/0271774 A1* | 10/2012 | Clegg | 705/321 |
| 2012/0303834 A1 | 11/2012 | Adam | |
| 2013/0019154 A1 | 1/2013 | Wolfston, Jr. | |
| 2013/0019155 A1 | 1/2013 | Wolfston, Jr. | |

FOREIGN PATENT DOCUMENTS

| | | |
|---|---|---|
| KR | 10 2002 0069973 A | 9/2002 |
| KR | 10 2004 0006879 A | 1/2004 |
| KR | 10 2009 0116325 A | 11/2009 |

OTHER PUBLICATIONS

International Search Report and Written Opinion mailed Jun. 26, 2013, in International Application No. PCT/US2013/027491, filed Feb. 22, 2013, 11 pages.

Bidelman, E., "Capturing Audio & Video in HTML5," HTML5 Rocks, Feb. 22, 2012, <http://www.html5rocks.com/en/tutorials/getusermedia/intro> [retrieved Aug. 15, 2012], 11 pages.

Musselman, K., "Access Webcam With Flash," Kevin Musselman, Feb.-Apr. 2009, <http://www.kevinmusselman.com/2009/02/access-webcam-with-flash/> [retrieved Aug. 15, 2012], 14 pages.

Neubeck, J., "Capturing the Webcam in Silverlight 4," Silverlight Show, Dec. 10, 2009, <http://www.silverlightshow.net/items/Capturing-the-Webcam-in-Silverlight-4.aspx> [retrieved Aug. 15, 2012], 14 pages.

"Online Video Interviewing: Video CVs vs. Video Screening," Online Video Interview Application (OVIA), Jan. 19, 2011, <http://video-interviewing.com/video-cvs-vs-video-screening/> [retrieved Jun. 15, 2012], 4 pages.

"Online Video Interviewing: Video Interviews—5 Reasons Why They'll Be the End of Phone Interviews," Online Video Interview Application (OVIA), Nov. 22, 2010, <http://video-interviewing.com/video-interviews-5-reasons-why-theyll-be-the-end-of-phone . . . > [retrieved Jun. 15, 2012], 4 pages.

"Online Video Interviewing: Video Interview Tips," Online Video Interview Application (OVIA), Jul. 28, 2010, <http://video-interviewing.com/videointerviewtips/> [retrieved Jun. 15, 2012], 4 pages.

Schulzrinne, H., et al., "Real-Time Streaming Protocol (RTSP)," Internet Engineering Task Force (IETF), Apr. 1998, <http://www.ietf.org/rfc/rfc2326.txt> [retrieved Dec. 18, 2012], 63 pages.

Tran, D.D., et al., "The Capture API: W3C Working Draft Apr. 1, 2010," World Wide Web Consortium (W3C), Apr. 2010, <http://www.w3.org/TR/2010/WD-capture-api-20100401/> [retrieved Aug. 15, 2012], 29 pages.

Udom, I., "Online Video Interviewing: What's New in OVIA," Online Video Interview Application (OVIA), Aug. 18, 2010, <http://video-interviewing.com/whats-new-in-ovia/> [retrieved Jun. 15, 2012], 6 pages.

Udom, I., "Online Video Interviewing: What's New in OVIA (Sep. 2010)," Online Video Interview Application (OVIA), Sep. 13, 2010, <http://video-interviewing.com/what's-new-in-ovia-september-2010/> [retrieved Jun. 15, 2012], 6 pages.

"VC-Backed OVIA Changes Name, Adds Funding," peHUB, Jun. 6, 2012, <http://www.pehub.com/154137/vc-backed-ovia-changes-name-adds-funding/> [retrieved Jun. 15, 2012], 5 pages.

YouTube Help, "How to Use a Webcam to Record Video?" © 2012 YouTube, LLC, <http://support.google.com/youtube/bin/answer.py?hl=en&answer=57409> [retrieved May 31, 2012], 2 pages.

International Search Report and Written Opinion mailed Dec. 14, 2012, in International Application No. PCT/US2012/046099, filed Jul. 10, 2012, 10 pages.

Office Action mailed Aug. 28, 2012, in U.S. Appl. No. 13/494,702, filed Jun. 12, 2012, 16 pages.

Final Office Action mailed Dec. 31, 2012, in U.S. Appl. No. 13/494,702, filed Jun. 12, 2012, 13 pages.

Office Action mailed Aug. 29, 2012, in U.S. Appl. No. 13/180,330, filed Jul. 11, 2011, 14 pages.

Final Office Action mailed Sep. 11, 2013, in U.S. Appl. No. 13/180,330, filed Jul. 11, 2011, 17 pages.

Final Office Action dated Mar. 12, 2014, in U.S. Appl. No. 14/043,649, filed Oct. 1, 2013, 18 pages.

* cited by examiner

Reviewing: Applicant 1

Question 1: Where do you see yourself in ten years?

ASYNCHRONOUS VIDEO INTERVIEW SYSTEM

CROSS-REFERENCE TO RELATED APPLICATION

This application claims the benefit of U.S. Provisional Patent Application No. 61/602,566, filed Feb. 23, 2012, the entire disclosure of which is incorporated herein by reference.

BACKGROUND

In spite of the many recent advances in information technology, live, in-person interviews are still required for job applicants, university applicants, and the like. In-person interviews suffer from many drawbacks. They require scheduling (and often rescheduling) that must take into account office hours, travel time, and time zones, with a constant risk of cancellations and delays. They also are prone to unintended variation (e.g., by asking the same questions in different ways that elicit different responses) and bias (e.g., disfavoring candidates interviewed when the interviewer is tired). Further, in-person interviews tend not to be recorded or remembered accurately.

A common example of how technology can facilitate meetings that would otherwise not be possible to conduct in person is to conduct a meeting via satellite (such as on a television news program) or over the Internet (such as in a video conferencing context). Video conferencing can enhance collaboration and allow participants to connect with one another on a personal level, without requiring the participants to be present in the same location. With computer systems equipped with digital modems, digital video cameras, microphones, speakers, and the like, users at different locations can participate in a video conference in which conference participants can see and hear each other as they discuss various topics. In theory, video conferencing can provide significant cost and time savings for conference participants when compared with traditional meetings, and can allow collaboration between individuals who would not be able to meet in person due to scheduling conflicts or travel restrictions.

However, such meetings still have many drawbacks, independent of the traditional requirement that participants be in the same location. For example, live meetings are subject to time constraints. Even if the participants are not required to be in the same location, they must agree to participate on a particular day, at a particular time, and for a particular length of time. Although the burden of travel may be reduced, other factors may still prevent participation by one or more parties at the agreed-upon time. If a participant joins the meeting late or leaves the meeting early, or if early parts of the discussion take longer than expected, some topics may need to be allotted less time or omitted entirely. As another example, a live meeting requires an uninterrupted communication channel. A loss of connectivity between participants, even for a short time, can severely disrupt the meeting and reduce the available time in which the meeting can be conducted. These drawbacks are multiplied when more than two people are participating. Existing video conference tools can be used to conduct video interviews but are typically focused on providing approximations of in-person conversations, which tend to be disorganized, difficult to schedule, and difficult to analyze objectively. As a result, video conferences have many of the same limitations that in-person conversations do.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a server receives a plurality of pre-recorded video prompts and generates an interview script comprising at least two of the plurality of pre-recorded video prompts according to a prompt-ordering algorithm. Upon receiving an initiation request for an asynchronous video interview from the client computing device, the server transmits a video prompt from the interview script to be displayed at a client computing device as part of the asynchronous video interview, and receives a streamed video response to the video prompt from the client computing device. The interview script comprises the plurality of pre-recorded video prompts. The server can perform algorithmic analysis on content of the video response. The algorithmic analysis can include applying audio or video analysis algorithms to audio data or video data, respectively, of the video response. The algorithmic analysis also can include determining a time duration of the response. The analysis facilitates determining a response score for the video response.

In another aspect, a server obtains response preference data indicating a timing parameter for a video response in an asynchronous video interview. The timing parameter can include, for example, a time limit for the response, or an indication of whether recording of the response begins immediately after playback of the video prompt or after a predetermined time delay. The server transmits a video prompt and receives a video response to the video prompt in accordance with the response preference data. For example, the video response may be limited to a time limit. As another example, the video response may be recorded and then re-recorded, depending on preferences indicated in the response preference data.

In another aspect, a server computer in communication with a client computing device comprises a processor and computer-readable storage media having stored thereon computer-executable instructions configured to cause the server computer to transmit response preference data configured to indicate a timing parameter (e.g., a preferred time duration) for a video response to a video prompt in an asynchronous video interview; transmit the video prompt to be displayed in an interviewee user interface presented at the client computing device; receive the video response from the client computing device, wherein the video response is recorded in accordance with the response preference data; and perform algorithmic analysis on the content of the video response, wherein the algorithmic analysis facilitates determining a response score for the video response.

In another aspect, a computer-readable storage medium includes computer-executable instructions configured to cause a client computing device to: determine a timing parameter for a video response to a video prompt in an asynchronous video interview; and display a user interface configured to play the video prompt at the client computing device and display a set of one or more user interface elements based at least in part on the timing parameter. For example, if the timing parameter indicates that recording of the response will begin immediately following playback of the video prompt, the set of user interface elements may include some elements that are compatible with the timing parameter (such as a countdown timer or a button that can be activated to indicate that the response is complete) while omitting other elements that are not compatible with the timing parameter (such as a "begin recording" button).

In another aspect, a video prompt and an information supplement (e.g., a news item) that relates to the content of the video prompt are transmitted, and a video response to the video prompt and the information supplement is received. The information supplement relates to content of the video prompt, and can be used to augment an interview question.

In another aspect, a server performs analysis of a video response recorded at a client computing device in a video interview. Based on the analysis, the server automatically selects a video prompt (e.g., a follow-up question) to be displayed at the client computing device. For example, a follow-up prompt (e.g., "Please elaborate" or "Would you please expand on that?") can be automatically selected if a response to a previous question has a time duration that is below a threshold value. As another example, a text transcript or keywords from a response to a previous question can be analyzed, and a follow-up question can be automatically selected based on the analysis of the text transcript or keywords.

In another aspect, a server receives information about an interviewee (e.g., personal information, demographic information, language preferences, etc.), performs analysis of the received information about the interviewee, and, based on the analysis, automatically selects a video prompt to be displayed at a client computing device as part of a video interview. For example, if the information about the interviewee includes a language preference, a question that is presented in the interviewee's preferred language can be automatically selected.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure includes descriptions of various aspects of exemplary video interview systems and processes. In one example scenario, an interviewee operating a computing device is prompted to play one or more video prompts (e.g., questions or statements by an interviewer intended to elicit a responses) on multimedia output devices and record responses using multimedia input devices, as described in more detail below. An interview engine then transmits (e.g., over a network such as the Internet) the interviewee's responses, which can then be reviewed and analyzed.

Exemplary asynchronous video interview systems and processes described herein do not require interviewees to participate in an interview in a particular location, on a particular day, or at a particular time. Exemplary video interview systems and processes described herein also do not require live participation by interviewers, and facilitate enhanced review of responses at a time that is convenient for the reviewers. Although it is a common view that an interviewer's present-sense evaluation of an interviewee's performance during a live interview is a good predictor of future performance, recent research supports the idea that live interviews often fail to achieve their goals of accurately evaluating interviewees. See Daniel Kahneman, *Thinking, Fast and Slow* (2011).

Described video interview systems and related processes may be useful for entities that receive large numbers of applicants for a small number of openings (e.g., universities, employers, or other institutions). For example, universities may receive thousands of applications, even though they will admit only a small percentage of applicants. Using a video interview system, an admissions officer of a university can browse and review video interviews when making admissions decisions. As another example, employers may receive hundreds of applications for a single open position. Using a video interview system, a human resources or recruitment officer of an organization can browse and review video interviews when making hiring decisions.

Figure 1:
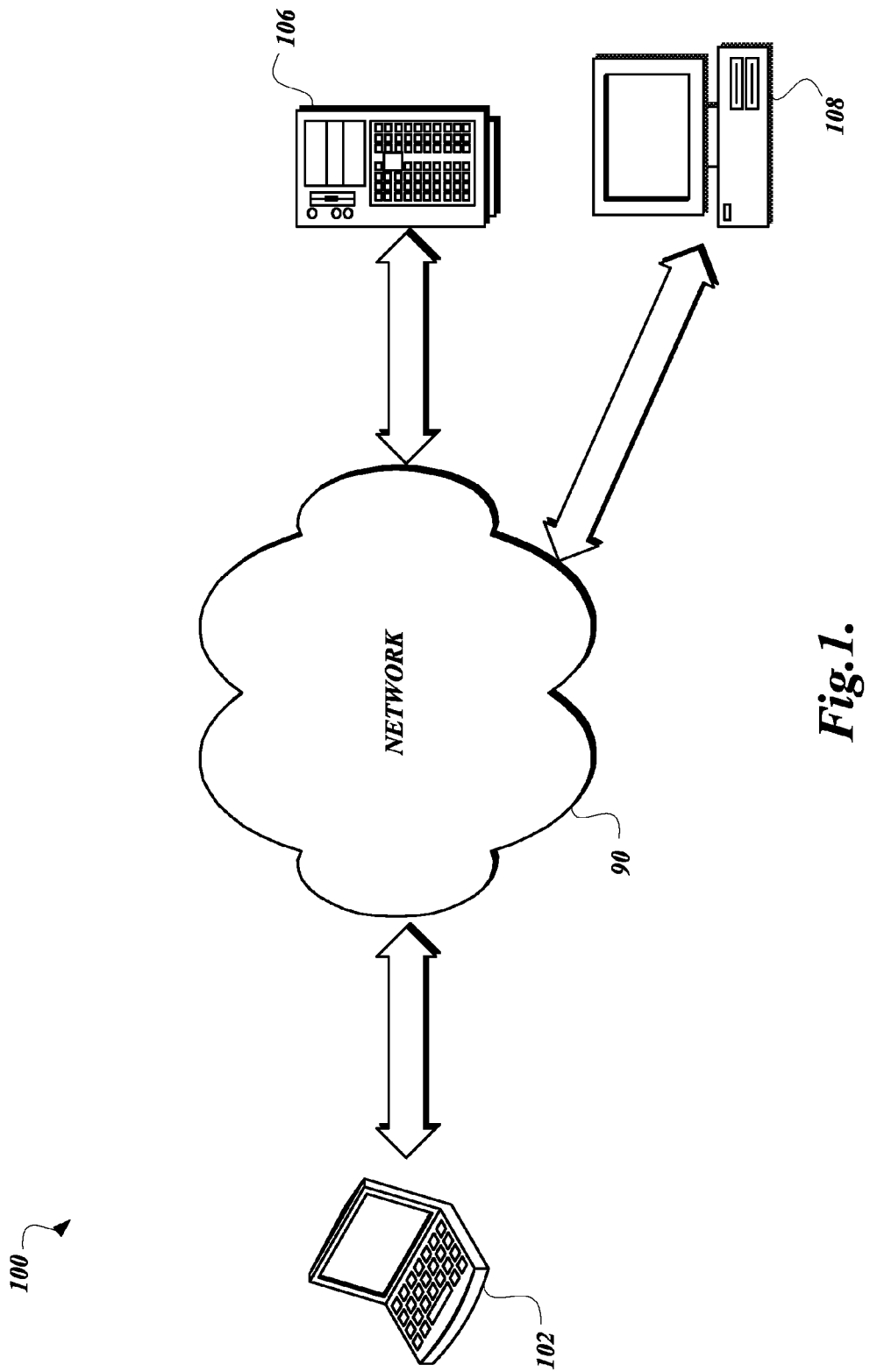
FIG. 1 is a block diagram that illustrates a generalized video interview system according to various aspects of the present disclosure.

FIG. 1 is a block diagram that illustrates a generalized video interview system 100 according to various aspects of the present disclosure. The video interview system 100 includes a client device 102, an interview server 106, and an administrator device 108. The components of the video interview system 100 may communicate with each other via a network 90. The network 90 may comprise one or more sub-networks (not shown). For example, the network 90 may comprise a local area network (e.g., a Wi-Fi network) that provides access to a wide-area network such as the Internet. The client device 102 may be a computing device operated by an end user (e.g., an interviewee) to transmit and receive video data, audio data, or other data to the interview server 106. A reviewing user (or reviewer) operating the interview administrator device 108 may connect to the interview server 106 to, for example, upload recorded interview questions, stream live interview questions, monitor live interview responses, and browse and review recorded interview responses. For example, recorded responses can be presented as a playlist that allows reviewers to review responses in any order.

Figure 2:
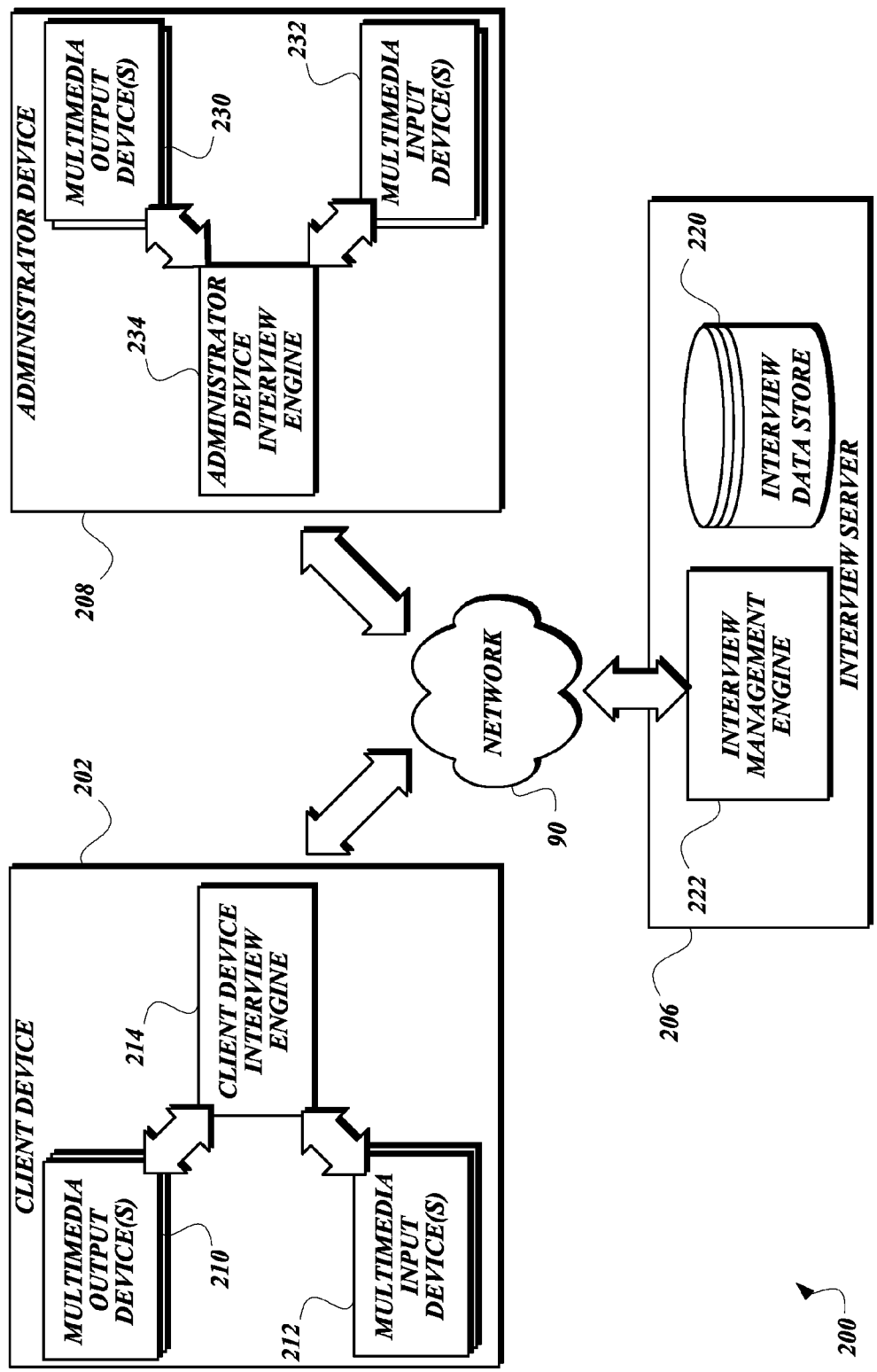
FIG. 2 is a block diagram that illustrates another example of a video interview system according to various aspects of the present disclosure.

FIG. 2 is a block diagram that illustrates another example of a video interview system. As shown in FIG. 2, the video interview system 200 comprises a client device 202, an interview server 206, and an administrator device 208.

In the example shown in FIG. 2, the interview server 206 comprises an interview data store 220 and an interview management engine 222. The interview data store 220 stores data (e.g., video data, audio data, configuration information, or other data) that relates to video interviews, such as data submitted by end users (e.g., an interviewee that interacts with client device 202, an administrator that interacts with administrator device 208, etc.), as will be described further below. The interview management engine 222 interacts with the interview data store 220 and facilitates communication between the interview server 206 and other devices. The interview management engine 222 may include a media server (e.g., an Adobe® Flash® Media Server or some other media server) that receives and transmits published media streams or other formats of media data.

The interview data store 220 can store definitions that define elements to be displayed to an end user on a client device 202 or administrator device 208. The interview management engine 222 can use such definitions to present graphical user interfaces to users. For example, a definition can be used to present a graphical user interface to guide an interviewee to respond to video prompts such as questions or other statements intended to elicit a response. As another example, a definition can be used to present a graphical user interface to guide a reviewer to select a particular interview response for viewing, to guide an interviewer to record an interview question, or to perform other tasks. Definitions can include information defining a set of interface elements. The interface elements, such as text boxes, soft buttons, checkboxes, drop-down boxes, multimedia response interface elements, and/or the like, may receive input from the end user (e.g., in response to prompts). The definition also can include information defining the layout, appearance, and behavior of interface elements. Examples of user interface layouts and elements are described in further detail below.

In the example shown in FIG. 2, the client device 202 includes multimedia output device(s) 210, multimedia input device(s) 212, and a client interview engine 214. The client interview engine 214 is configured to request information (e.g., user interface information, media data corresponding to interview questions) from the interview server 206 and send information (e.g., media data corresponding to interview answers, authentication information, user preferences, or other information) to the interview server 206. The client interview engine 214 is configured to cause multimedia output device(s) 210 to output content related to video interviews. For example, a display device can display graphics and/or text corresponding to a user interface, video corresponding to video prompts or previews of recorded responses, or other content. In one example scenario, an interviewee is prompted to play an interview question and record a response using multimedia input device(s) 212, as described in more detail below. The client interview engine 214 then transmits the interviewee's responses to the interview management engine 222 executing on interview server 206. The interview management engine 222 can transmit the responses at an appropriate time (e.g., in response to an authorized request) to another device such as administrator device 208.

In the example shown in FIG. 2, the administrator device 208 includes multimedia output device(s) 230, multimedia input device(s) 232, and an administrator interview engine 234. The administrator interview engine 234 is configured to request information (e.g., user interface information, media data corresponding to interview answers) from the interview server 206 and send information (e.g., media data corresponding to interview questions, authentication information, configuration information, or other information) to the interview server 206. The administrator interview engine 234 is configured to cause multimedia output device(s) 230 to output content related to video interviews. For example, a display device can display graphics and/or text corresponding to a user interface, video corresponding to recorded responses, or other content. In one example scenario, a reviewer is presented with a playlist of recorded responses by different interviewees, and can select a response to review. In response to the selection, the interview management engine 222 transmits the recorded response to the administrator interview engine 234. In another example scenario, an interviewer is prompted to record a video prompt using multimedia input devices 232. The administrator interview engine 234 then transmits the recorded video prompt to the interview management engine 222. The interview management engine 222 can transmit the video prompt at an appropriate time (e.g., in response to an authorized request) to another device such as client device 202.

The client interview engine 214 and the administrator interview engine 234 can be implemented in whole or in part by a web browser appropriately configured for conducting or participating in a video interview, such as the Internet Explorer® browser by Microsoft Corporation, the Firefox® browser by the Mozilla Foundation, and/or the like. Configuration of a web browser may include browser plug-ins or other modules that facilitate recording and viewing video. Alternatively, the client interview engine 214 can be implemented as a custom desktop application or mobile application specially configured for conducting or participating in a video interview.

In any of the described examples, an "engine" may include computer program code configured to cause one or more computing device(s) to perform actions described herein as being associated with the engine. For example, a computing device can be specifically programmed to perform the actions by having installed therein a tangible computer-readable medium having computer-executable instructions stored thereon that, when executed by one or more processors of the computing device, cause the computing device to perform the actions. An exemplary computing device is described further below with reference to FIG. 15. The particular engines described herein are included for ease of discussion, but many alternatives are possible. For example, actions described herein as associated with two or more engines on multiple devices may be performed by a single engine. As another example, actions described herein as associated with a single engine may be performed by two or more engines on the same device or on multiple devices.

In any of the described examples, a "data store" contains data as described herein and may be hosted, for example, by a high-capacity database management system (DBMS) to allow a high level of data throughput between the data store and other components of a video interview system. The DBMS may also allow the data store to be reliably backed up and to maintain a high level of availability. For example, a data store may be accessed by other components of a video interview system via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of video interview systems described herein. Separate data stores may be combined into a single data store, or a single data store may be split into two or more separate data stores.

In any of the described examples, media data can be captured by multimedia input devices and transmitted or stored for future processing. The processing may include encoding data streams, which can be subsequently decoded for presentation by multimedia output devices. Captured media data can be stored by saving media data streams as files on a computer-readable storage medium (e.g., in memory or persistent storage on client device 202, interview server 206, administrator device 208, or some other device). Referring to FIG. 2, multimedia input devices 212, 232 may include a video camera. A video camera, when active, may provide a stream of video data. As another example, multimedia input devices 212, 232 may include a microphone. A microphone, when active, may provide a stream of audio data. Multimedia input devices 212, 232 can be separate from and communicatively coupled to the client device 202 or administrator device 208, or can be integral components of the client device 202 or the administrator device 208, respectively. In some embodiments, multiple multimedia input devices may be combined into a single device (e.g., a video camera with an integrated microphone). Any suitable multimedia input device either currently known or developed in the future may be used with described video interview systems.

The multimedia output devices 210, 230 may include video output devices such as a display or touchscreen. The multimedia output devices 210, 230 also may include audio output devices such as external speakers or earphones. The multimedia output devices 210, 230 can be separate from and communicatively coupled to the client device 202 or administrator device 208, or can be integral components of the client device 202 or the administrator device 208, respectively. In some embodiments, multiple multimedia output devices may be combined into a single device (e.g., a display with built-in speakers). Any suitable multimedia output device either currently known or developed in the future may be used with described video interview systems.

In any of the described examples, digital signal processors (which can be implemented in hardware, software, or some combination of hardware and software) can be used for processing media data such as audio data and video data. For example, a digital signal processing module can include encoders to encode and/or decoders to decode encoded data in formats such as MP3, Vorbis, AAC, HE-AAC, or Windows Media Audio (WMA) for audio, or MPEG-2/H.262, H.263, VC-1, or H.264 for video. Different encoding and decoding modules are typically used for encoding and decoding data in different formats. In a typical scenario, an encoder on one device encodes media data for subsequent decoding by a decoder on another device, although a single device can include both encoders and decoders. For example, the client device 202 may include one or more decoders for decoding encoded media data (e.g., video data that corresponds to interview questions), as well as one or more encoders for encoding captured media data (e.g., video data that corresponds to interview answers).

Encoded media data can be delivered in a data stream. As used herein, the term "stream" refers generally to a flow of information delivered from one device to another over a communication link (e.g., a network connection), and is not limited to any particular content, transfer protocol, or data format. A stream may represent portions or "packets" of a larger file, such an audio file or a video file. In general, a stream can be used for different purposes, such as delivering live content (e.g., live audio or video broadcasts) or for delivering pre-recorded content without having to deliver a larger file. A stream can be processed for playback on a device. For example, a data stream comprising audio data and video data can be processed by decoding the audio data and the video data and rendering it for output by one or more output devices. The term "streaming" can be used to refer to the process of delivering or receiving a stream. In a typical streaming media scenario, media information is buffered by the receiving device before being processed for playback in order to mitigate the possible effects of varying delivery rates. Streaming can be accomplished using any protocols suitable for streaming media such as Real-Time Transport Protocol (RTP), Real-Time Streaming Protocol (RTSP), Real-Time Control Protocol (RTCP), other protocols, or combinations of protocols (e.g., combinations of transfer protocols and control protocols). In general, data that can be delivered via streaming also can be packaged into larger files for delivery. For example, a client device can download a file containing video data corresponding to an entire pre-recorded interview question and can begin decoding and playing the corresponding video when the entire video file has been downloaded.

A video interview process may depend on conditions of components of the video interview system 200. Conditions can be monitored to help ensure proper functioning of the interview system 200. For example, a component of the system 200 (e.g., interview management engine 222) may test components of the client device 202 (e.g., multimedia input devices 212 such as a video camera and microphone) or cause the client device 202 to test its own components before allowing the interview process to begin or before performing certain actions, such as recording responses. As another example, a component of the system 200 may check microphone levels, lighting levels, or other parameters to make sure that recorded answers will be readily audible and viewable. To check such parameters, a test question and answer can be used. The test answer can be analyzed by a component of the system 200 (e.g., interview management engine 222) or by a human user (e.g., a reviewer operating administrator device 208 or an interviewee operating client device 202). Adjustments can then be made based on the detected conditions. Upon receiving an indication of a successful test, the interview process can continue.

Depending on detected conditions, users may be prompted to make adjustments. For example, if no audio signal is detected, or if the audio signal is too weak, too strong, or distorted, an interviewee can be prompted to check the function or positioning of a microphone at the client device 202. As another example, if no video signal is detected, the interviewee can be prompted to check the function of the video camera. As another example, if the video signal is too dark, the interviewee can be prompted to turn on or move closer to a light source. As another example, if the interviewee is not visible in the frame, the interviewee can be prompted to adjust the positioning of the video camera or to sit or stand in a different location.

The video interview process can be conducted in different ways. For example, an interviewee can be asked a predetermined set of questions (e.g., in a predetermined order or in random order) or a random set of questions selected from a question bank. The interviewee also can be asked to select particular questions from a set of questions. The questions that are asked or available for selection by the interviewee can be the same for all interviewees or can vary among interviewees. Or, some questions can be asked of all interviewees, while other questions are targeted to particular interviewees. Whichever questions are used, recording the questions ahead of time can help to reduce the risk of interviewer bias by ensuring that interviewees responding to a particular question will have that question presented to them in the same way.

Application forms or other data related to interviewees can be analyzed to determine whether particular subjects may be explored by asking particular questions, or whether some questions that are applicable to some interviewees may not be applicable to others. Targeted questions can be selected algorithmically based on data associated with an interviewee (e.g., geographic location, native language, gender, credentials such as grade point average, or other data). For example, a question selection algorithm can determine that the interviewee has indicated salary requirements that are higher than an open position will pay and select a question that asks whether the interviewee would be willing to accept a lower salary. As another example, a question selection algorithm can determine that the interviewee has claimed financial hardship when applying for a scholarship and select a question that asks the interviewee to describe the relevant circumstances. Targeted questions also can be based on previous interview questions or answers. For example, if an interviewee has elected to answer a question about a particular achievement in a previous job, a question selection algorithm can select a follow-up question that asks how the interviewee's employer benefited from that achievement.

Video prompts can be presented in different ways. For example, an interviewee can set question preferences such as language preferences (e.g., the interviewee's native language) or preferences for how questions are presented (e.g., whether questions will be asked by a male or female interviewer). Question preferences also can be set automatically or by a user affiliated with the organization that is conducting the interview (e.g., based on facts that are known about an interviewee). For example, a female interviewee may be automatically presented with questions that are asked by a female interviewer. Preferences can be the same for all questions, or can vary by question. For example, a native Spanish speaker applying to a university where courses are taught in English may have some questions presented in Spanish while also having some questions presented in English in order to demonstrate command of the English language. Live questions can be used in place of or in combination with recorded questions. Though they may be presented to an interviewee without being prerecorded, live questions can be recorded and stored (e.g., for later playback to reviewers).

Interview responses can be recorded and collected in different ways. For example, responses can be collected and stored in a single video file in separate files. Separate files can be combined into larger files comprising multiple responses. Questions also can be stored in the same files as answers, allowing for the possibility that an entire video interview can be stored in a single file. During the answering process, a client device can display a video or still-frame image of an interviewer appearing to listen to the interviewee's responses. Options for interview responses can be configured. For example, an administrator can determine whether an interviewee can play back a recorded answer as a preview and/or re-record the answer before submitting it. Disabling re-recording can encourage candid, spontaneous answers, while allowing re-recording can make applicants more comfortable with the interview process and potentially encourage more applicants to agree to the interview.

The timing of responses can be handled in different ways. For example, recording of an answer can be configured to start when playback of an interview question stops. However, other approaches can be used. For example, a time delay between the end of a question and recording of the answer can be introduced to allow the interviewee time to think about the question before answering. Time delays between playback of questions and recording of answers can be configured (e.g., via administrator device 208). For example, the next question (if further questions are to be asked) can begin playback immediately upon detection of a completed answer, or after a delay. A completed response can be detected in different ways. For example, a response can be considered complete when an extended period of silence is detected following an extended period of speech, when a particular phrase (e.g., "next question" or "final answer") is detected using speech recognition techniques, or when a user interface element (e.g., a "stop recording" or "next question" button) is activated. Options for detecting completion of an answer can be configured as desired. For example, an administrator can choose how to detect when an answer is complete. The interviewee also may be given control over when the recording of an answer will begin (e.g., via a "record" button or other user interface element that can be activated by a user as desired).

Information can be collected to provide a description (such as a timeline) for the interview. Responses can be associated with data objects such as time points. Time points can indicate, for example, when questions were asked and answered. As another example, particular questions and answers can be identified (e.g., by number, by content of the question or answer, or in some other way). Timestamps and other information can be added to the timeline automatically or by users. For example, a user of administrator device 208 can be given the option to add comments to the timeline at selected points to flag noteworthy events (e.g., a particularly insightful comment or a defensive reaction by the interviewee) or invite discussion among the other reviewers.

Algorithmic Analysis Examples

Algorithmic analysis can be performed on interview responses. Algorithmic analysis can facilitate evaluation of interview responses, such as by providing information on which a response score can be based. Different combinations of algorithmic analysis results can be used to generate a score, and can be weighted to a greater or lesser extent, depending on system design, reviewer preference, or other factors. Other information can be used to generate a response score (e.g., in combination with algorithmic analysis results). For example, a reviewer can evaluate a response (e.g., by viewing a response and looking at algorithmic analysis results) and provide his or her own score for the response. The score provided by the reviewer can be used as a component score on which the response can be based. For example, component scores from several reviewers can be averaged and combined with other component scores (e.g., component scores based on algorithmic analysis results) to arrive at an overall response score.

Algorithmic analysis also can be used for other purposes. For example, algorithmic analysis can be used to determine whether a follow-up question should be asked, and what the follow-up question should be. The specific types of algorithmic analysis described herein are only examples, and can be replaced or supplemented with other types of algorithmic analysis, as may be appropriate for a particular system or process to be implemented.

Algorithmic analysis can be performed while an interview is being conducted (e.g., to determine whether a property of the answer indicates that a follow-up question might be appropriate). For example, to determine whether a response has a time duration that is shorter than expected or desired, the time duration of a response can be measured (or obtained in some other way, such as by inspecting metadata corresponding to the response) and compared with a threshold value. If the time duration is below the threshold value, a follow-up question (e.g., "Would you like to expand on that?" or "Can you tell me a bit more about that?") can be played to prompt the interviewee to further elaborate on his or her answer. If an answer to a question is determined to have another property, such as low volume, a follow-up question (e.g., "I'm having trouble hearing you—would you mind repeating your answer?") can be played to prompt the interviewee to speak in a louder voice or adjust the microphone.

During or after the interview, speech recognition algorithms can be used to obtain a text transcript of some or all of the interview. Further analysis can be performed on the text transcript (e.g., by algorithms or by human reviewers). For example, a score can be applied to answers based on the content of the text transcript (e.g., based on keywords), and scores for different interviewees can be compared. As another example, follow-up questions can be selected based on content (e.g., keywords) of the text transcript.

During or after the interview, algorithms can be used to analyze audio and video information to detect possible emotional responses or behavioral cues. For example, facial recognition or other computer vision algorithms can be used to determine level of eye contact, identify facial expressions, interpret body language, or perform other kinds of analysis. As another example, various algorithms can be used to analyze audio waveform peaks, inflection range, pauses and gaps (e.g., gap from the end of a question to the beginning of an answer), or other characteristics in order to provide information about an interviewee's answer. Audio and video analysis algorithms can be used to evaluate responses. For example, if an interviewee is applying for a stressful job that requires calm responses in emotional situations, audio or video analysis algorithms can be used to detect emotion or stress during an answer to a particular question.

Many examples of algorithmic analysis described herein can be used to generate a score for an interview response, either independently or in combination. In one example scenario, an applicant for a position that requires frequent and extensive conversations with customers may receive a score based on algorithmic analysis results such as average length of response (e.g., by receiving a lower score for short responses to open-ended questions). Further, some examples of algorithmic analysis can be used both to generate a score and for other purposes. In the example scenario described above, the applicant may receive a lower score for short responses to open-ended questions, and the short responses may also automatically trigger follow-up questions.

Review of Responses

Any number of reviewers can review video interviews, although access can be limited as desired (e.g., by limiting permissions to only selected staff members). Reviewers may use information collected during the interview (such as answers to questions) or derived from the interview (such as text analytics) to generate other information, such as a score for the interview. Such information can be correlated with other information that relates to the interviewee, such as an ultimate decision on the interviewee (e.g., whether they are admitted to a university or hired after the interview), future performance of the interviewee (e.g., grade point average or work review scores for some period of time (e.g., one year) after admission or hiring, respectively), or other information. Reviewers can associate performance scores with individual answers and can give an overall score to an interviewee based on the overall interview and/or other information, such as information contained in a resume or application form.

Reviewers can be given the option to record follow-up questions which can then be presented to the interviewee (or a group of interviewees) in a second video interview, which may be similar in purpose to an in-person follow-up or "callback" interview. Personalized follow-up questions can be based on previous responses or other information provided by an interviewee. Personalized follow-up questions can be combined with other questions that may not be personalized. For example, some questions may be presented to all interviewees that advance to a second round of interviews, while other questions in the second round of interviews may be personalized to individual interviewees.

Reviewers also can record their own analysis (e.g., by making a video or audio recording) of any of the interviewee's responses. The recorded analysis can be saved for future reference or analyzed by other reviewers.

Different reviewers can review different parts of an interview. For example, in an interview for university admission, questions relating to a particular area of study can be designated for review by faculty in the relevant department, while questions of more general interest can be reviewed by other reviewers. As another example, reviewers may choose to review individual components (e.g., audio only, video only, audio and video) of an interview or information related to an interviewee (e.g., information from a resume or application form). Reviewers may review video interviews based on different criteria. For example, in an interview for a job that requires frequent public appearances, some reviewers may evaluate video interviews based on criteria such as personal appearance and speaking style, while other reviewers may focus on the content of the interviewee's answers. Evaluation can be performed on an interview that is in progress or an interview that has been completed.

Reviewers can be given the option of providing feedback on interviews. For example, the administrator device 208 can include a user interface with graphical dials, sliders, buttons, or other controls to allow reviewers to provide feedback during a review of the interviewee's responses. Feedback can be aggregated into an overall score. For example, when a reviewer provides feedback (such as a positive or negative rating), a new score can be stored along with a timestamp or code linking the feedback to a portion of the video response. Such feedback can be given as the interviewee is providing a live response, or after the response is recorded. Aggregation of feedback provided by multiple reviewers can allow for identification of trends to help evaluate interviews (e.g., by identifying an answer or a portion of answer that was particularly liked or disliked by several reviewers).

During playback of the video interview files, trick modes such as fast forward, rewind, pause, and various other playback options can be used. For example, reviewers can pause playback to enter comments or other annotations.

Combining Video Interview Functionality with Other Tools

Described video interview systems (or components of such systems) and processes may be used in combination with other tools. Described video interview systems can be integrated into existing workflows as part of an overall recruitment process. For example, systems that provide services such as application form processing can be adapted to include video interview functionality.

Figure 3:
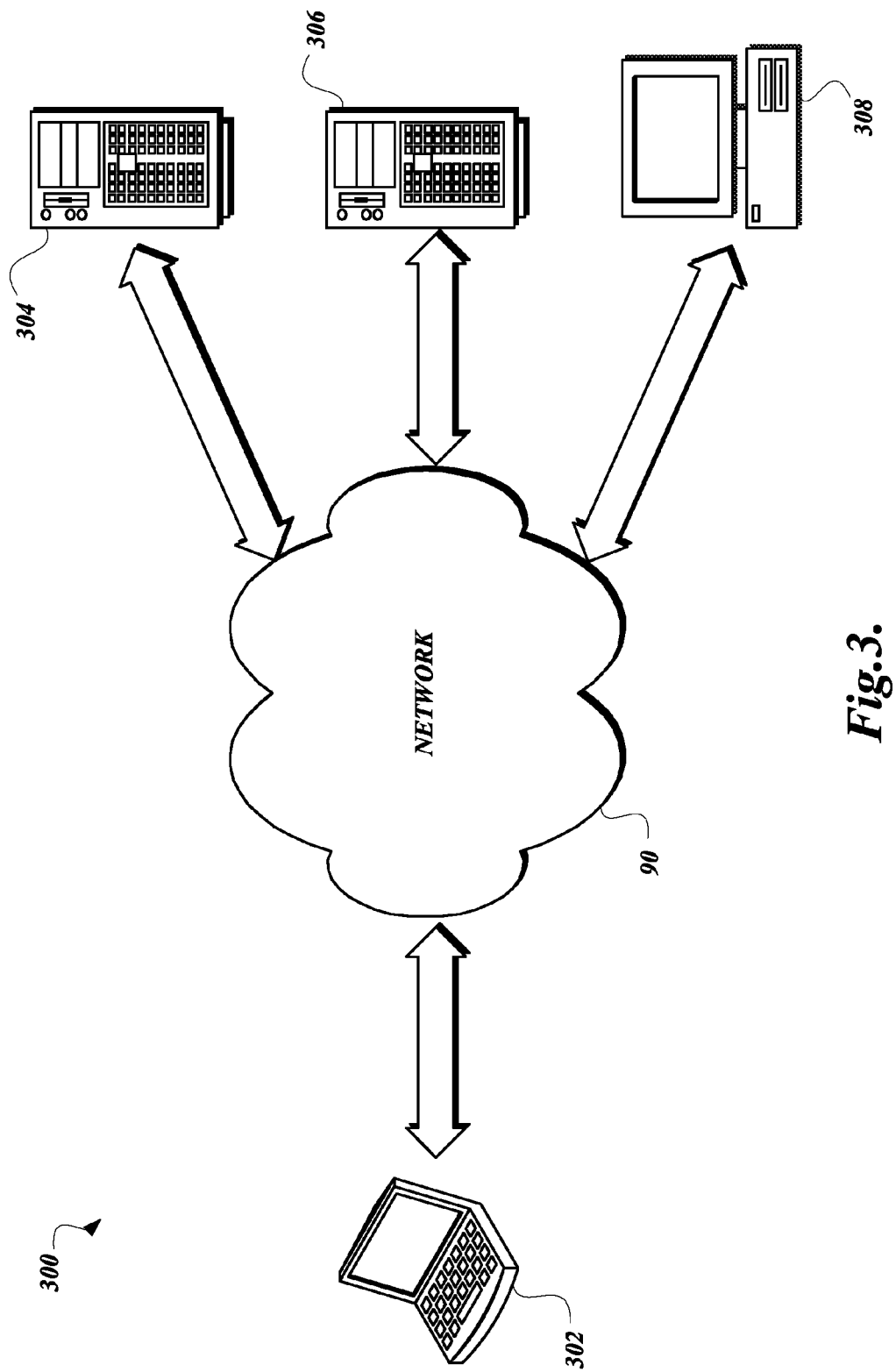
FIG. 3 is a block diagram that illustrates an example of an application system with video interview functionality according to various aspects of the present disclosure.

In the example shown in FIG. 3, an application system 300 with video interview capability includes a form processing server 304 that may cause an information form (such as a fillable application form) to be displayed on a client device 302. Such forms can be used to collect demographic information that can be used to analyze an applicant pool, or personal information that can be used to evaluate individual applicants. The form can include standard text prompts and answer fields, and also can include multimedia prompts and/or answer fields. The form also can include information relating to a video interview to be conducted as part of the application process. Such information can include a URL or hyperlink that allows a user to connect to the interview server 306 and participate in a video interview. The form processing server 304 may store information entered into a form.

The client device 302 can include a form display engine (not shown) configured to request form definition information, along with components shown in client device 202 in FIG. 2. Upon receiving the form definition information, the form display engine can display form prompts and input fields to an end user and collect the end user's responses in the input fields. The responses can then be sent to one or more other devices for processing. The administrator device 308 can include tools for browsing and reviewing form submissions, along with components shown in administrator device 208 in FIG. 2. The form display engine and tools for browsing and reviewing form submissions can be implemented in a standard web browser, such as the Internet Explorer® browser by Microsoft Corporation, the Firefox® browser by the Mozilla Foundation, and/or the like. Alternatively, the form display engine and tools for browsing and reviewing form submissions can be implemented in a specially-configured desktop application or mobile application.

Once form submissions are received and stored by the form processing server 304, a reviewer may use the administrator device 308 to browse and review the form submissions, which may be stored by the form processing server 304. For example, a reviewer may review form submissions as part of a review process that also includes reviewing video interview answers on the administrator device 308. Review of form submissions may be useful, for example, where a reviewer wishes to confirm the accuracy of an applicant's answer in an interview by comparing the answer with information in a form submission. Form submission information may include a transaction ID, a record of the information submitted, and a record of the prompts that were displayed. The form submission information may be associated with interview data (e.g., via a transaction ID) to facilitate organization and review.

User Interface Examples

Figure 6:
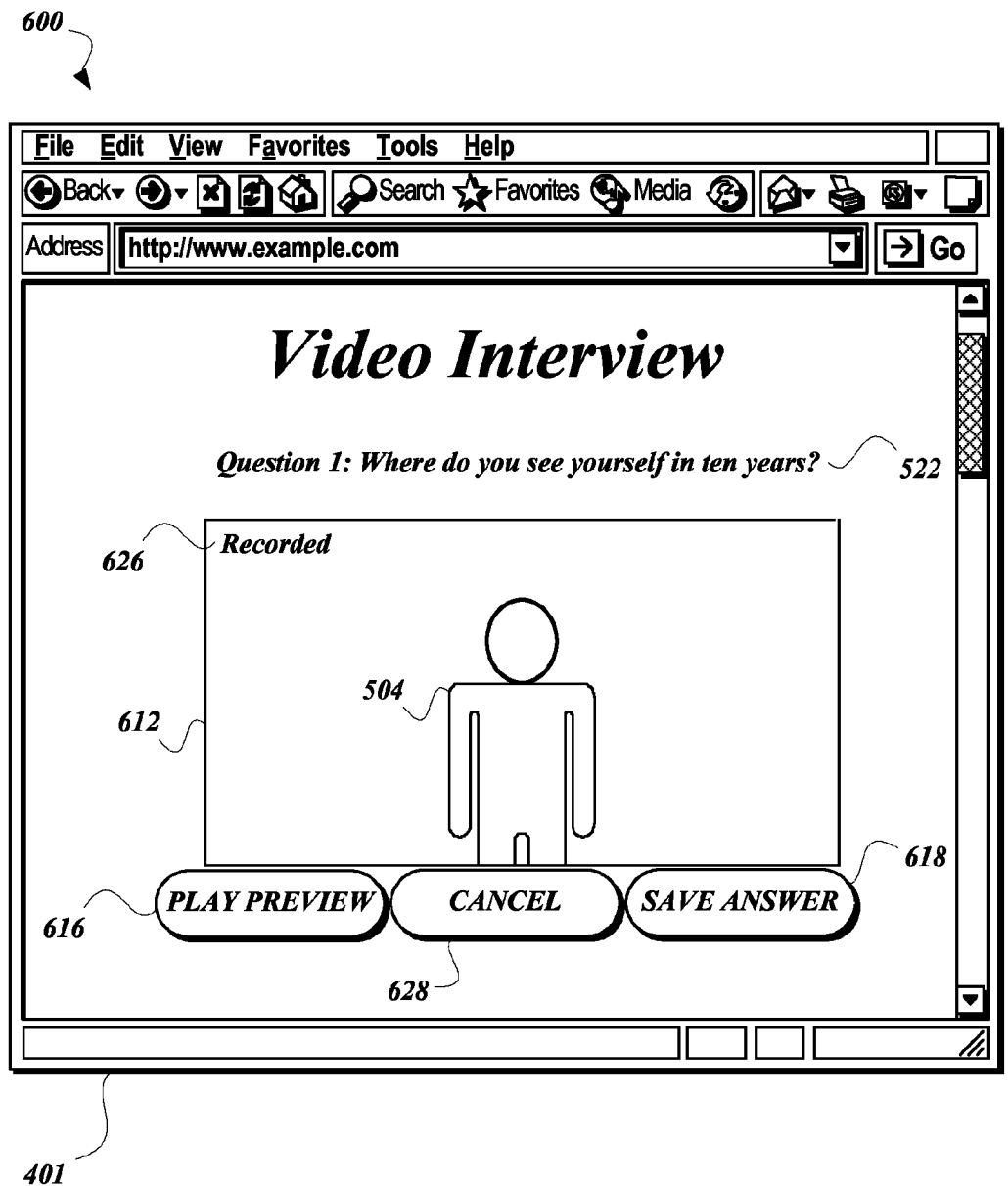
Figure 7:
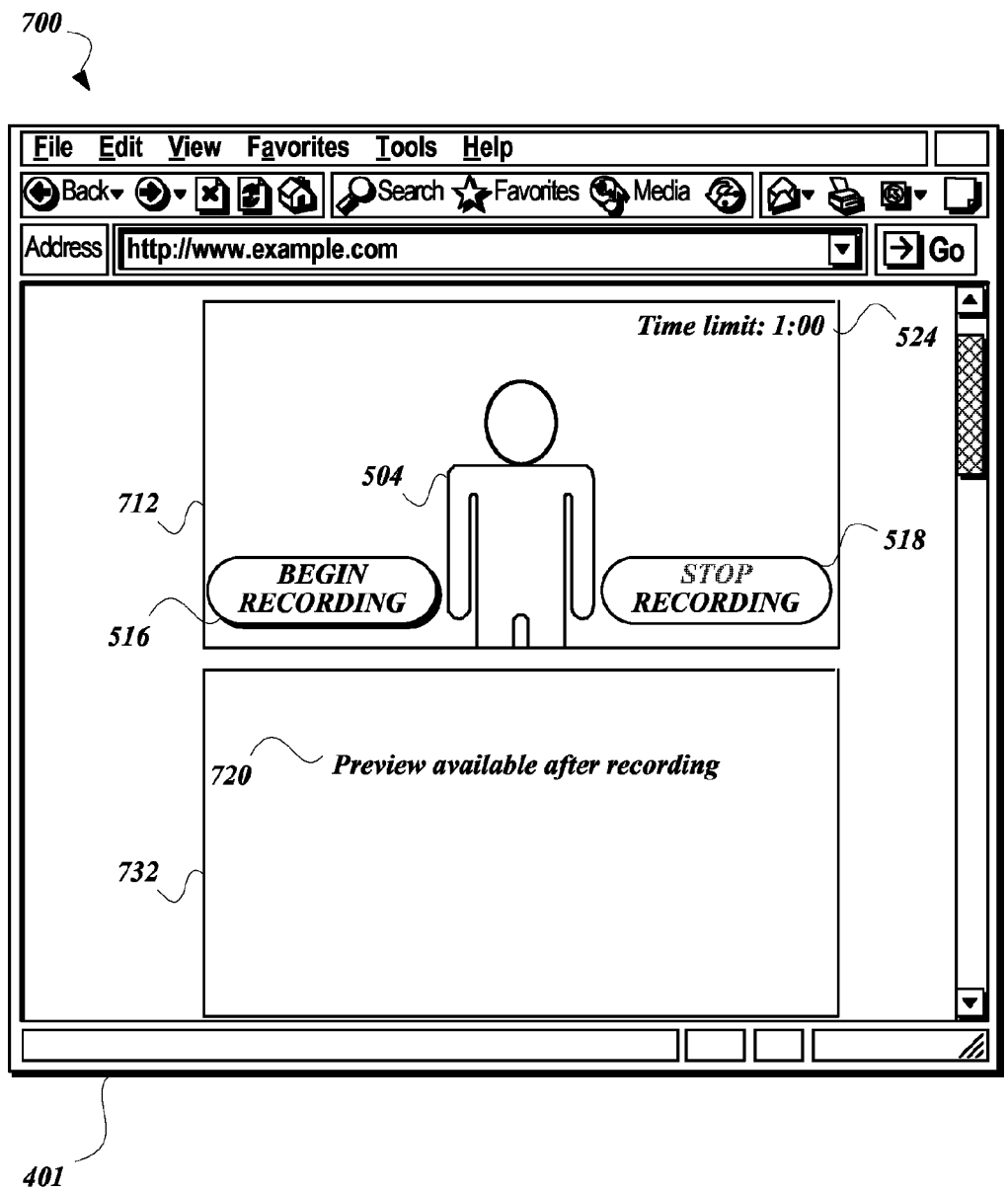
Figure 8:
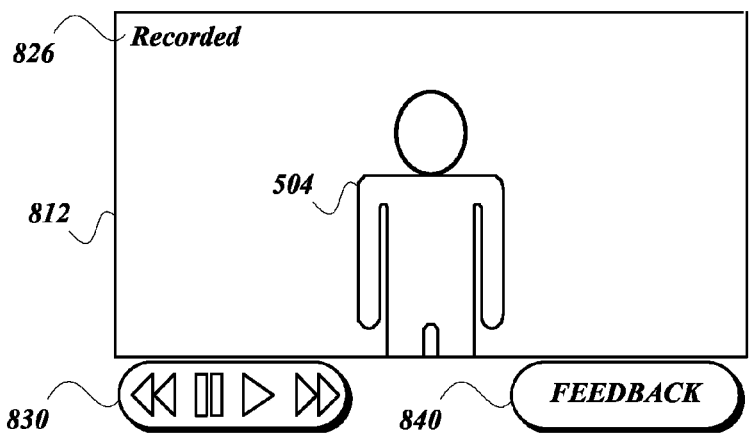
FIG. 8 illustrates one embodiment of a reviewer user interface according to various aspects of the present disclosure.
Figure 8:
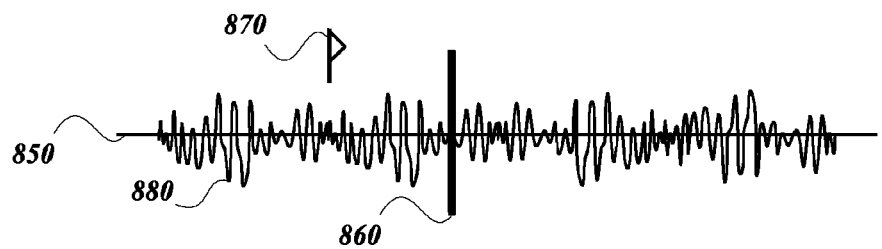

FIGS. 4A, 4B, 5, 6, and 7 illustrate example user interfaces that may be presented to an interviewee or other user of a client device (e.g., client device 202 in FIG. 2), and FIG. 8 illustrates an example interface that may be presented to a reviewer or other user of an administrator device (e.g., administrator device 208 in FIG. 2). The illustrated interfaces are depicted as being presented in a web browser 401. The interface elements displayed by the web browser 401 are generated by an interview engine (e.g., client device interview engine 214 or administrator device interview engine 234, respectively), which may include code downloaded by the web browser 401 from the interview server 206.

The interfaces shown in FIGS. 4A through 8 are exemplary only, and not limiting. The elements shown in FIGS. 4A through 8 may be supplemented or replaced by any number of other elements exhibiting the same functionality or different functionality. The interfaces shown in FIGS. 4A through 8 may be provided in a browser 401 as shown, in a standalone application executing on a client device or administrator device, in a server application executing in a cloud computing environment, or in some other way. In any of the described examples, user interface elements can be actuated by a keystroke, voice activation, mouse click, or any other suitable user input event. User input events such as voice activation that do not require a user to manipulate an input device (such as a mouse or keyboard) may enable an interviewer or an interviewee to record a more natural looking video.

Figure 4A:
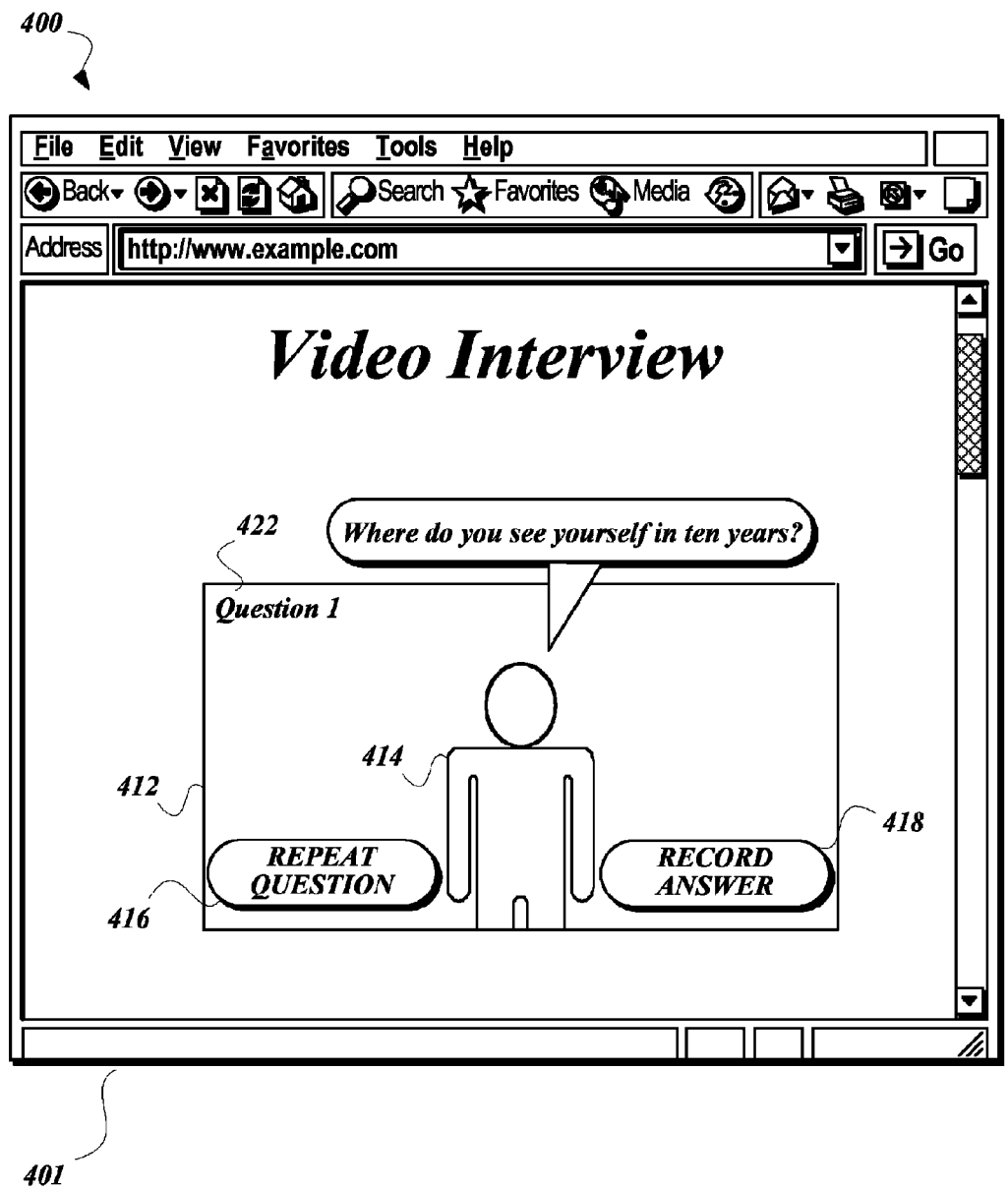
FIGS. 4A, 4B, 5, 6, and 7 illustrate embodiments of an interviewee user interface according to various aspects of the present disclosure.
Figure 4B:
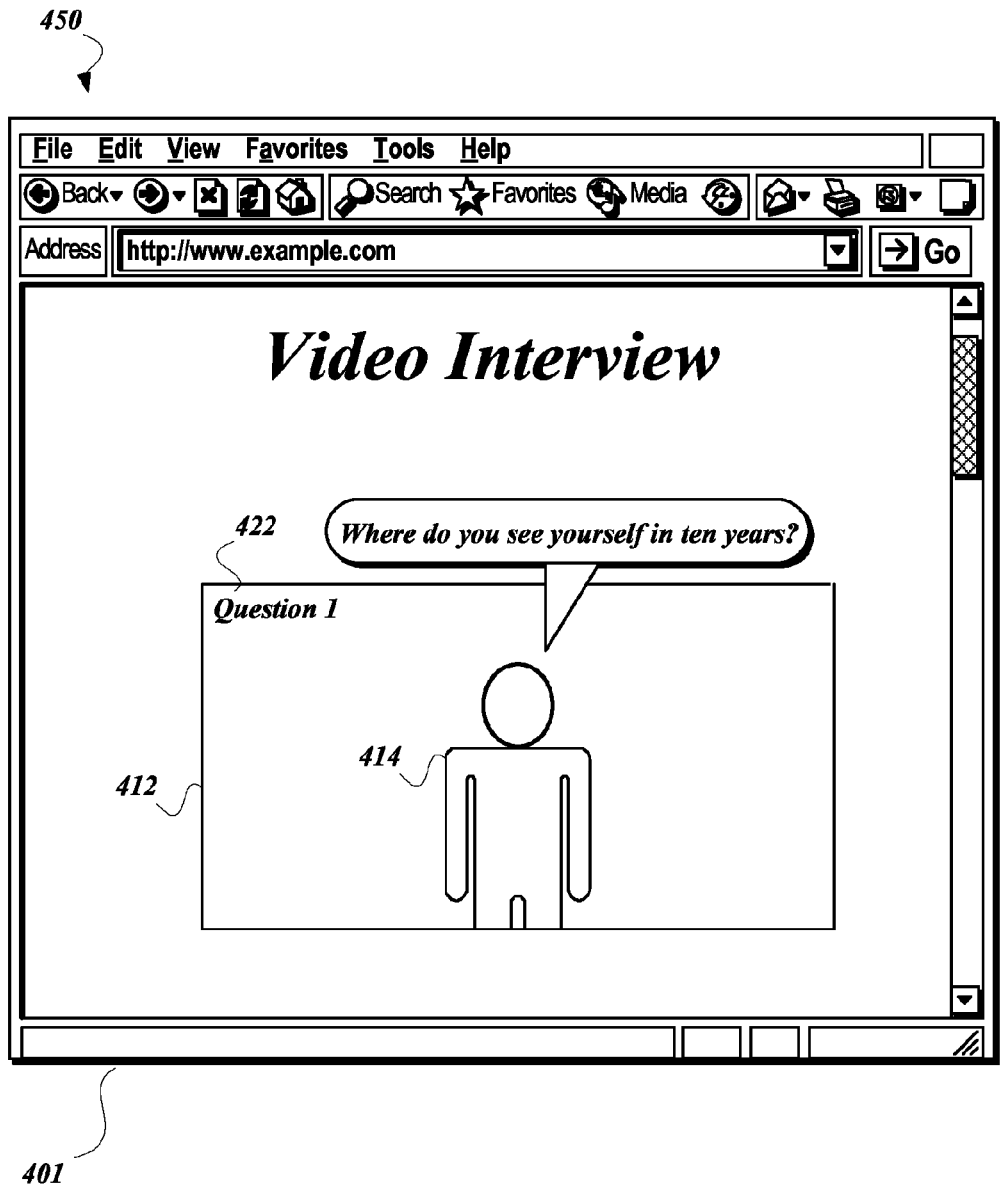

In the example shown in FIG. 4A, an interviewee interface 400 includes a video element 412 depicting an interviewer 414 and interactive user interface elements including a "repeat question" button 416 and a record button 418, which can be used to respond to a question identified as "Question 1" by a question identifier 422. In the example shown in FIG. 4A, the text of the question ("Where do you see yourself in ten years?") is shown for illustrative purposes only and need not be displayed. Typically, the question is spoken by the interviewer 414 and presented with accompanying audio, although this is not required and may not be desirable in some scenarios such as where the interviewee is hearing-impaired. In such scenarios, the text of the question can be displayed as shown or communicated in some other way (e.g., by sign language, with or without subtitles). As illustrated, the video element 412 can respond to activation of the record button 418, at which point the client device 202 will begin recording the interviewee's answer. The repeat question button 416 can be used to cause the question to play again. In the example shown in FIG. 4B, an interviewee interface 450 contains many of the same elements as interface 400, but some user interface elements (e.g., "repeat question" button 416, record button 418) are omitted. The interface 450 can be useful in a scenario where recording of the interviewee's response begins immediately after a video prompt has stopped playing. Such scenarios can better mimic a live interview by omitting user options for waiting indefinitely before answering a question or for previewing a recorded answer before submitting it.

Figure 5:
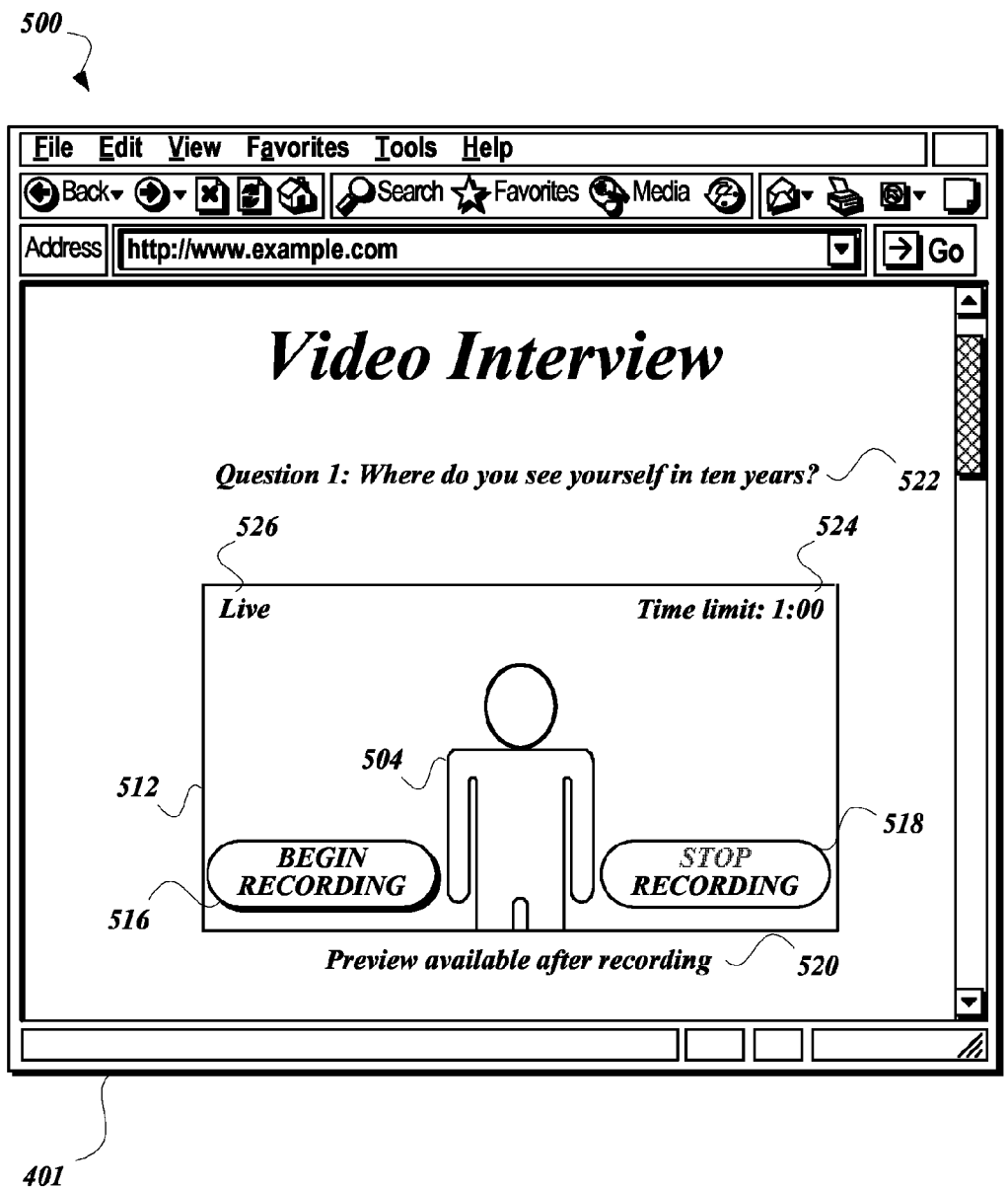

In the example shown in FIG. 5, an interviewee interface 500 includes a video element 512 depicting the interviewee 504 (e.g., as viewed by a video camera attached to the client device 202) and interactive user interface elements including a record button 516 and a stop button 518, which can be used to respond to a question identified as "Question 1" by a question identifier 522. The text of the question ("Where do you see yourself in ten years?") can be provided as a reminder, but need not be displayed. As illustrated, the client device can respond to activation of the record button 516, at which point the client device will begin recording the interviewee's answer. The stop button 518 can be used to stop recording. Preview text 520 indicates that a preview of the recorded answer will be available after recording. The countdown timer 524 indicates time remaining for recording an answer. A status indicator 526 indicates that the video shown in the video element 512 is live, and not previously recorded.

In the example shown in FIG. 6, an interviewee interface 600 includes a video element 612 depicting the interviewee 504 in an answer preview mode. Interactive user interface elements including a play button 616, a cancel button 628, and a save button 618 can be used to play a recorded answer, cancel a recorded answer, and save a recorded answer, respectively. A status indicator 626 indicates that the video shown in the video element 612 is previously recorded.

In the example shown in FIG. 7, an interviewee interface 700 includes multiple video elements 712, 732. The video element 712 depicts the interviewee 504 and includes interactive user interface elements including a record button 516 and a stop button 518. The countdown timer 524 indicates time remaining for recording an answer. The video element 732 is configured to show a recorded answer in an answer preview mode. Preview text 720 indicates that a preview of the recorded answer will be available after recording.

In the example shown in FIG. 8, a reviewer interface 800 includes a video element 812 depicting the interviewee 504 (identified as "Applicant 1") in a recorded response. Status indicator 826 indicates that the video shown in the video element 812 is a previously recorded response to a question identified as "Question 1" by a question identifier 822. Playback controls 830 allow playback of the response to be paused, rewound, etc. during review. The feedback button 840 is an element that a reviewer can activate to give feedback on the response. The timeline 850 shows a graphical depiction of the interview segment being reviewed. The marker 860 shows the current playback position. The flag 870 indicates a time point in the interview. The time point associated with the flag 870 can indicate, for example, a time at which a reviewer added feedback, the beginning of an answer, or some other aspect of the interview. The flag 870 may itself be an active element in the user interface 800. For example, clicking on the flag 870 may cause information such as reviewer feedback to be displayed. A waveform 880 provides a visual depiction of a signal (such as an audio signal) associated with the interview. The waveform 880 and/or other tools can be used to analyze an interview (e.g., by showing points in the interview where the interviewee is speaking louder or softer in response to different questions).

Many alternatives to the user interfaces described above are possible. For example, in any of the examples described herein, multiple video elements can be used. A reviewer can be presented with an interface that shows the interviewee in one video element and the interviewer in another video element. Or, an interface can show multiple interviewees in multiple video elements (e.g., giving responses to the same question). Multiple video elements can be displayed simultaneously, or one after the other, in any orientation or configuration. As another example, interviewees and reviewers can be presented with information that differs from the information shown in FIGS. 4A through 8. In a follow-up interview context, an interviewee can be provided with an indicator in the user interface that identifies the current interview as a follow-up interview, and a reviewer can be provided with information that indicates, for example, an interviewee's previous response to a question in a first round of interviews. Such information can include, for example, a transcript of the previous response or feedback on the previous response that has been provided by a reviewer. Such information can be useful, for example, to help a reviewer to determine whether an interviewee's response to a follow-up question is consistent with the interviewee's previous response.

Example Techniques

FIGS. 9 through 14 illustrate example techniques that may be used when conducting video interviews.

Figure 9:
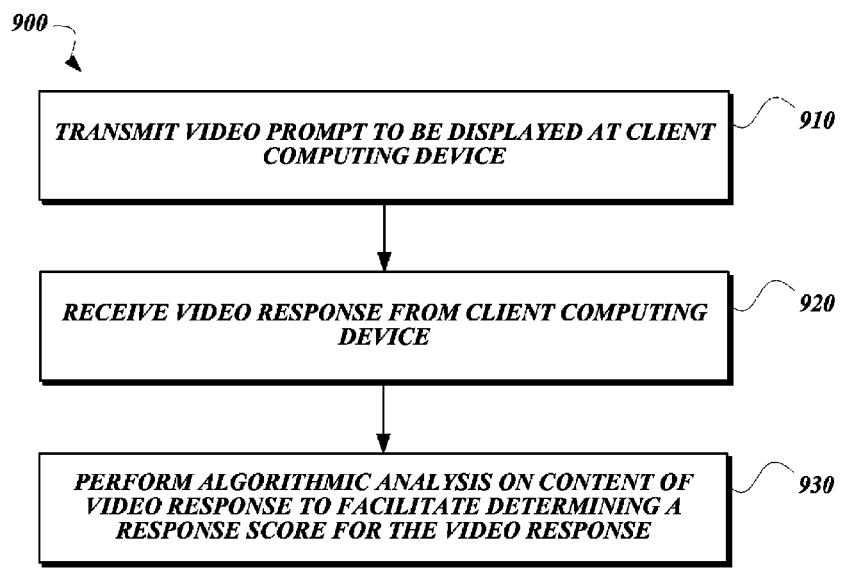
FIGS. 9, 10, 11, 12, 13, and 14 are flow charts that illustrate example techniques according to various aspects of the present disclosure.

In the technique 900 shown in FIG. 9, at 910, a computing device (e.g., a server) transmits a video prompt to be displayed at a client computing device as part of a video interview. At 920, the computing device receives a video response from the client computing device. In one example scenario, the video response includes video data and audio data. At 930, the computing device performs algorithmic analysis on content of the video response. The algorithmic analysis can include applying audio or video analysis algorithms to the audio data or the video data, respectively. The algorithmic analysis also can include determining a time duration of the response. The analysis facilitates determining a response score for the video response. The computing device can cause the video response and/or results of the algorithmic analysis to be displayed in a reviewer user interface. The computing device may receive feedback or a component score from a reviewer (e.g., via the reviewer user interface) on which the response score can be based.

Figure 10:
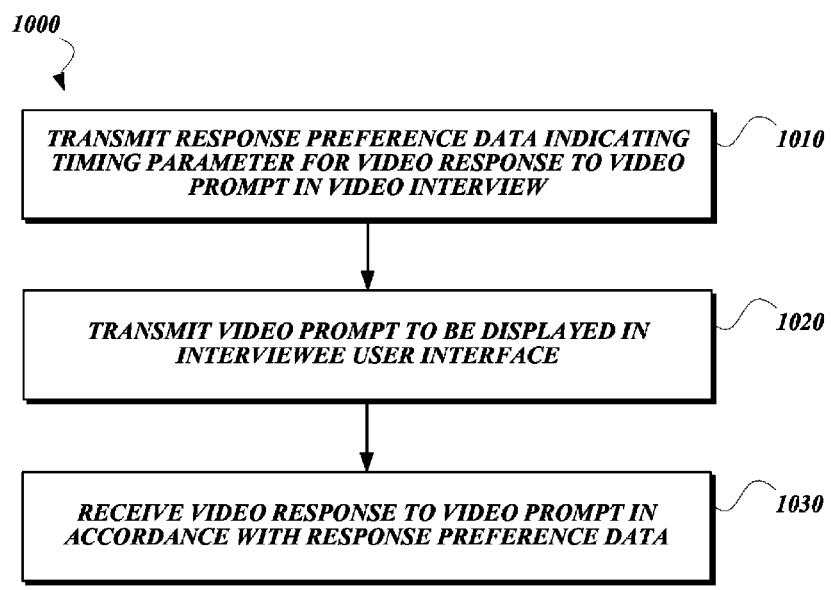

In the technique 1000 shown in FIG. 10, at 1010, a computing device (e.g., a server) obtains response preference data indicating a timing parameter for a video response in a video interview. The response preference data may be obtained, for example, from an administrator device, or a data source such as a database. In one example scenario, the response preference data indicates preferences set by an administrator for how a video interview should be conducted. The response preference data may be transmitted to a client device at which the response will be recorded. Alternatively, response preference data may be used at a server to enforce rules for recording the response at a client device, without requiring transmission of response preference data directly to the client device.

The timing parameter can include a time limit for the response, or an indication of whether recording of the response begins immediately after playback of the video prompt, or after a predetermined time delay. Time delays may be desirable to allow interviewees to consider their answers for a limited time before answering. Besides timing parameters, response preference data also may indicate other preferences, such as whether re-recording of a response is permitted. At 1020, the computing device transmits a video prompt. At 1030, the computing device receives a video response to the video prompt in accordance with the response preference data. For example, the video response may be limited to a time limit. As another example, the video response may be recorded and then re-recorded, depending on preferences indicated in the response preference data.

Figure 11:
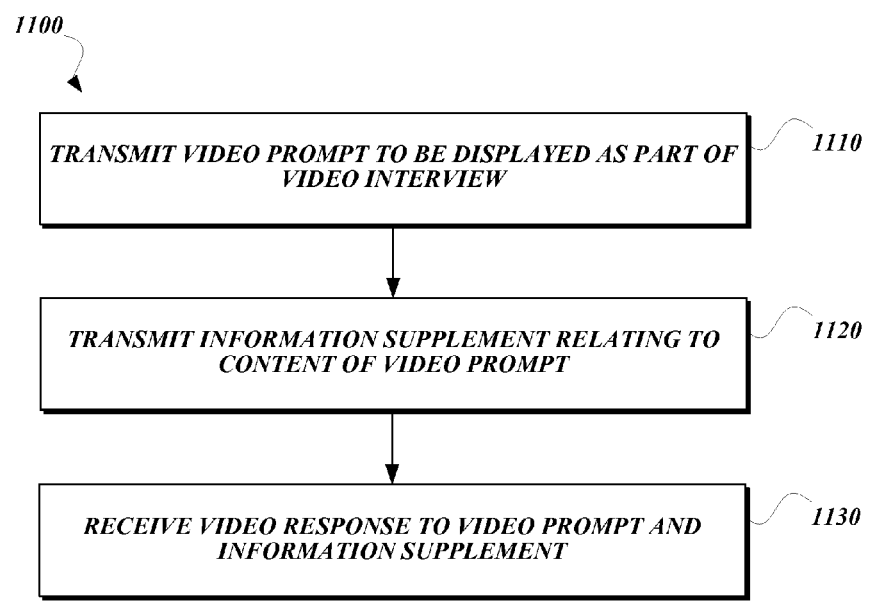

In the technique 1100 shown in FIG. 11, at 1110, a computing device (e.g., a server) transmits a video prompt to be displayed as part of a video interview in an interviewee user interface presented at a client computing device. At 1120, the computing device transmits an information supplement to be displayed at the client computing device. The information supplement relates to content of the video prompt and can be used to augment an interview question.

In one example scenario, an applicant for a position (e.g., a political advisor or public relations position) answers questions that are intended to evaluate the applicant's ability to quickly review a news item and develop a strategy for responding to the news item. In this example scenario, the information supplement can comprise a news item, such as a video clip, picture, news article, or newsfeed with daily headlines, that relates to the content of a question (e.g., "How would you respond if a journalist showed you this article?" or "Which of these headlines merits the most attention, and why?"). In another example scenario, the information supplement can comprise an information form (e.g., a web form) to be filled out by the interviewee by supplying user input at the client computing device. In another example scenario, the information supplement can be a legal document (e.g., an exhibit) that relates to an interview question in a legal context (e.g., a deposition in which the exhibit is being discussed). The information supplement can be presented to the interviewee at the same time as an interview question, prior to an interview question, and/or after an interview question.

Figure 12:
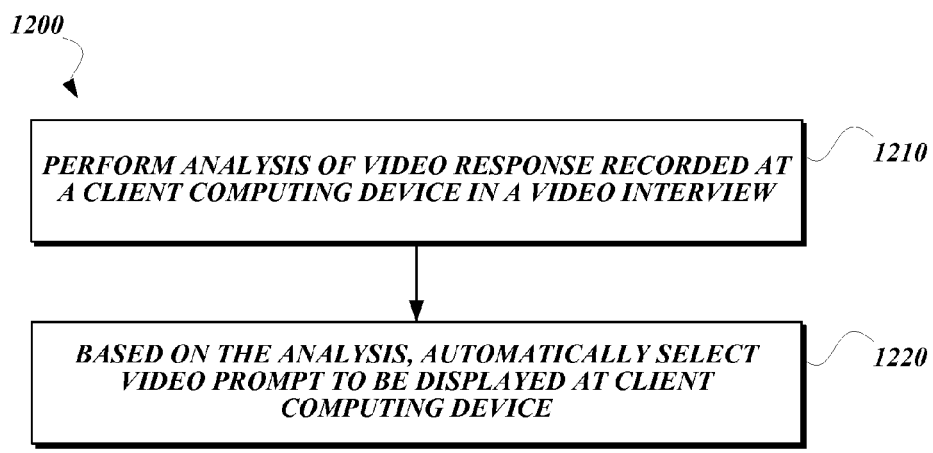

In the technique 1200 shown in FIG. 12, at 1210, a computing device (e.g., a server) performs analysis of a video response recorded at a client computing device in a video interview. At 1220, based on the analysis, the computing device automatically selects a video prompt (e.g., a follow-up question) to be displayed at the client computing device. For example, a follow-up prompt (e.g., "Please elaborate" or "Would you please expand on that?") can be automatically selected if a response to a previous question has a time duration that is below a threshold value. As another example, a text transcript or keywords from a response to a previous question can be analyzed, and a follow-up question can be automatically selected based on the analysis of the text transcript or keywords. In one example scenario, if a text transcript of a response in a job interview contains the word "salary," a follow-up question that asks about the interviewee's salary requirements can be automatically selected.

Figure 13:
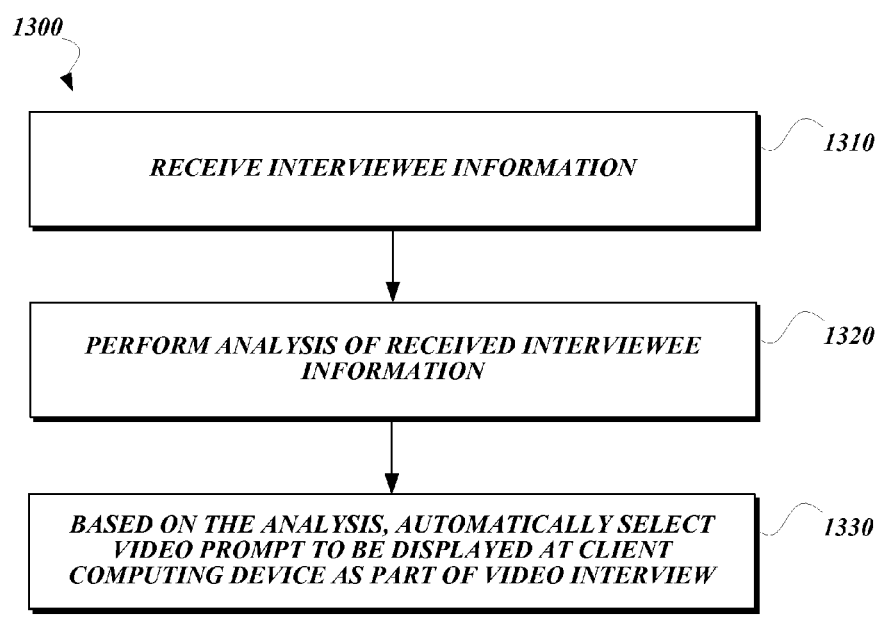

In the technique 1300 shown in FIG. 13, at 1110, a computing device (e.g., a server) receives interviewee information. Interviewee information refers to information about the interviewee that does not come directly from a previous video response in the video interview, although the same information may also be provided in a video response. For example, interviewee information can be received from the interviewee via user input in a web form presented at a client computing device prior to the interview. Interviewee information also can be received from other sources, such as a database containing information previously provided by the interviewee. The interviewee information can include personal information (e.g., age, name, residence address), demographic information, language preferences, etc. The interviewee information also can include information that is relevant to the context of a particular interview. For example, in a job interview, the interviewee information can include salary history, education, or other relevant information. In an admissions interview for a university, the interviewee information can include standardized test scores, academic transcript data, or other relevant information.

At 1320, the computing device performs analysis of the received interviewee information. At 1330, based on the analysis, the computing device automatically selects a video prompt to be displayed at a client computing device as part of a video interview. For example, if the interviewee information includes details relating to a college degree, a question relating to the interviewee's college experience (e.g., "What was the most important thing you learned in college?") can be automatically selected based on the interviewee information. As another example, if the interviewee information includes a language preference, a question that is presented in the interviewee's preferred language can be automatically selected.

Figure 14:
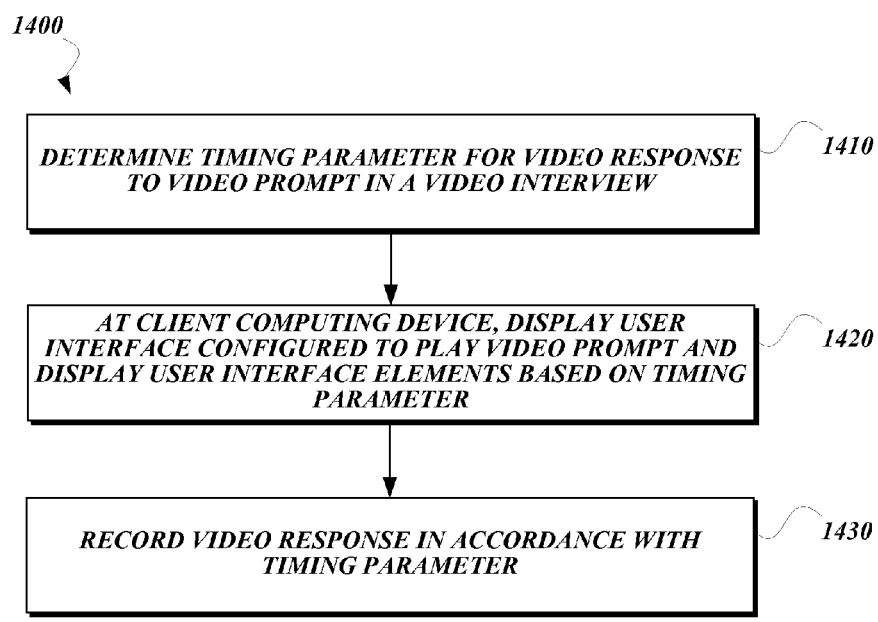

In the technique 1400 shown in FIG. 14, at 1410, a computing device (e.g., a client computing device) determines a timing parameter (e.g., a time limit) for a video response to a video prompt in a video interview. For example, a server that provides the video prompt to be displayed also may send configuration information that defines the timing parameter. At 1420, the computing device displays a user interface configured to play the video prompt and displays a set of user interface elements based at least in part on the timing parameter. For example, if the timing parameter indicates a time limit for the response or a predetermined time delay that precedes recording of the video response, a countdown timer can be displayed that shows the time remaining for the response or the time remaining before recording begins, as appropriate. As another example, if the timing parameter indicates that recording of the response will begin immediately following playback of the video prompt, the set of user interface elements may include some elements that are compatible with the timing parameter (such as a countdown timer or a button that can be activated to indicate that the response is complete) while omitting other elements that are not compatible with the timing parameter (such as a "begin recording" button). At 1430, the computing device records the video response in accordance with the timing parameter. For example, if the timing parameter indicates a time limit, recording can be stopped when the time limit is reached. As another example, if the timing parameter indicates a predetermined time delay that precedes recording of the video response, recording can begin when the predetermined time delay has expired.

Many alternatives to the described techniques are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Operating Environment

In any of the examples described herein, client devices and administrator devices may be any suitable computing devices, including, but not limited to, laptop computers, desktop computers, smart phones, tablet computers, and/or the like. Interview servers may include suitable computing devices configured to provide services described in further detail below. As used herein in the context of a server-client relationship, the term "server" refers generally to a computing device that provides information (e.g., video and audio data) and/or services to other devices over a communication link (e.g., a network connection), and is not limited to any particular device configuration. Servers may include one or more suitable devices, such as dedicated server computing devices, or virtualized computing instances or application objects executing on a computing device. The term "client" can be used to refer to a computing device (e.g., a client device 202, an administrator device 208) that obtains information and/or accesses services provided by a server over a communication link, and is not limited to any particular device configuration. However, the designation of a particular device as a client device does not necessarily imply or require the presence of a server. At various times, a single device may act as a server, a client, a server and a client, or neither, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 15:
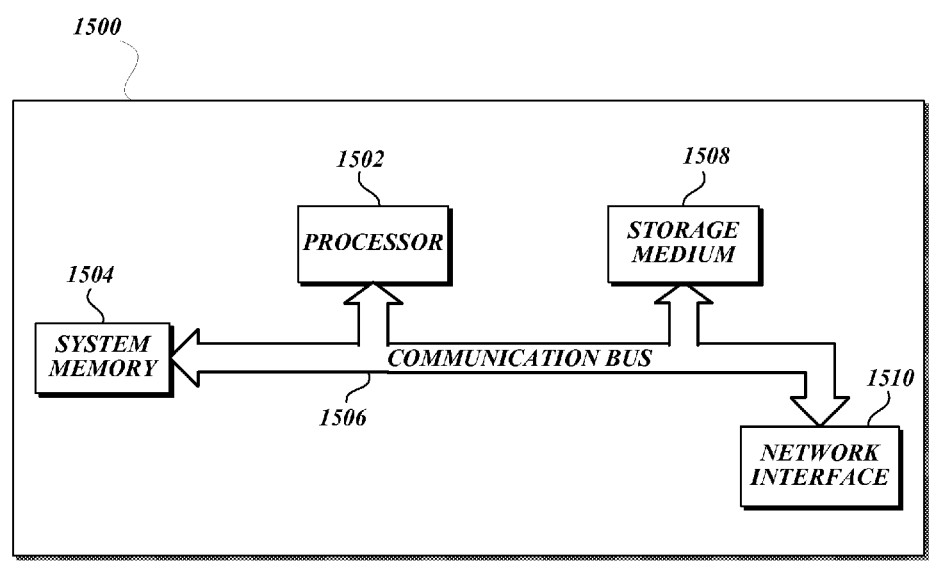
FIG. 15 illustrates aspects of an exemplary hardware architecture of a computing device suitable for use with various embodiments of the present disclosure.

FIG. 15 is a block diagram that illustrates aspects of an exemplary computing device 1500 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 1500 includes at least one processor 1502 and a system memory 1504 connected by a communication bus 1506. Depending on the exact configuration and type of device, the system memory 1504 may be volatile or nonvolatile memory, such as read only memory ("ROM"), random access memory ("RAM"), EEPROM, flash memory, or other memory technology. Those of ordinary skill in the art and others will recognize that system memory 1504 typically stores data and/or program modules that are immediately accessible to and/or currently being operated on by the processor 1502. In this regard, the processor 1502 may serve as a computational center of the computing device 1500 by supporting the execution of instructions.

As further illustrated in FIG. 15, the computing device 1500 may include a network interface 1510 comprising one or more components for communicating with other devices over a network. Embodiments of the present disclosure may access basic services that utilize the network interface 1510 to perform communications using common network protocols. The network interface 1510 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 11, the computing device 1500 also includes a storage medium 1508. However, services may be accessed using a computing device that does not include means for persisting data to a local storage medium. Therefore, the storage medium 1508 depicted in FIG. 15 is optional. In any event, the storage medium 1508 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer-readable instructions, data structures, program modules, or other data. In this regard, the system memory 1504 and storage medium 1508 depicted in FIG. 15 are examples of computer-readable media.

For ease of illustration and because it is not important for an understanding of the claimed subject matter, FIG. 15 does not show some of the typical components of many computing devices. In this regard, the computing device 1500 may include input devices such as a keyboard, keypad, mouse, trackball, microphone, touchpad, touchscreen, stylus, and/or the like. Such input devices may be coupled to the computing device 1500 by wired or wireless connections including RF, infrared, serial, parallel, Bluetooth, USB, or other suitable connections protocols using wireless or physical connections. The computing device 1500 may also include output devices such as a display, speakers, printer, etc.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a storage medium) or computer storage device and be stored on and executed by one or more general-purpose or special-purpose processors, thus creating a special-purpose computing device configured to provide functionality described herein.

Extensions and Alternatives

The methods and systems could be used for a wide variety of purposes, including admissions processes, market research, job interviews, academic testing (e.g., for oral examinations), tutoring and teaching (e.g., to allow instructors to answer questions posed by students outside of class or office hours), dating sites (e.g., for interviewing dating prospects), or any other context where questions and answers can be submitted asynchronously. The methods and systems disclosed herewith may be implemented in connection with or as part of or using the methods and systems disclosed in U.S. patent application Ser. No. 13/180,330, filed Jul. 11, 2011, and U.S. patent application Ser. No. 13/494,702, filed Jun. 12, 2012, which are incorporated herein by reference.

In any of the examples described herein, data can be transmitted securely. For example, an interviewee can be invited (e.g., by a university or prospective employer) to provide a secure username and password for authentication (e.g, via a web browser using secure HTTP (or HTTPS) and TLS (Transport Layer Security) or SSL (Secure Sockets Layer) protocols) in order to participate in a video interview and can send encrypted data streams (e.g., via an encrypted Real-Time Messaging Protocol (RTMP) such as RTMPS or RTMPE) containing interview responses.

Systems, system components, and processes described herein may be provided and used by a single institution or by multiple institutions. For example, a video interview system may provide college application interview services for multiple colleges. A video interview system may provide customized user interfaces particular to each institution. Data for multiple institutions may reside in a single data store or in multiple data stores.

Many alternatives to the described video interview systems are possible. For example, although only a single client device and administrator device are shown in FIGS. 1-3 for ease of illustration, the described systems can comprise multiple client devices and administrator devices, which can interact with the system one at a time or simultaneously. Multiple reviewers at multiple administrator devices can review and comment on responses to expedite the review process. As another example, although interview servers are described that handle information and provide services, alternative arrangements are possible in which client devices operated by interviewees communicate directly with devices operated by reviewers or other interview administrators. In such arrangements, functionality such as storing and organizing interview data associated with various interviewees that is described as being handled by an interview server can be shifted instead to devices operated by reviewers or other interview administrators.

Although some examples refer to interviewers as being users of an administrator device, actual interview questions can be delivered by other entities (e.g., according to instructions or scripts provided by an institution that wishes to interview an applicant). For example, an organization that wishes to interview a native speaker of Chinese may wish to hire another native speaker of Chinese from outside the organization to record interview questions, which can then be provided to the organization for subsequent use in video interviews. Furthermore, although reviewers and interviewers can be different users, in practice the same user can act as both an interviewer and as a reviewer.

Interviewees can receive feedback. For example, interviewees can receive text, audio, or video critiques in a manner similar to the way interview questions are received. Such features can be useful, for example, in practice interviews coordinated by a career services department of a university.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A computer-implemented method for conducting a video interview, the method comprising:
   by a server, performing analysis of a video response recorded at a client computing device in an asynchronous video interview, wherein the analysis comprises determining a time duration of the video response; and
   by the server, based on the time duration of the video response, automatically selecting a video prompt to be displayed at the client computing device as part of the asynchronous video interview.

2. The method of claim 1, further comprising:
   transmitting a video prompt to be displayed as part of an asynchronous video interview in an interviewee user interface presented at a client computing device; and
   transmitting an information supplement as part of the asynchronous video interview to be presented at the client computing device, wherein the information supplement relates to content of the video prompt;

wherein the video response is responsive to the video prompt and responsive to the information supplement.

3. The method of claim 2, wherein the information supplement comprises an information form, the method further comprising receiving data corresponding to user input in the information form.

4. The method of claim 2, wherein the information supplement comprises at least one of a news item and a document.

5. The method of claim 1, further comprising comparing the time duration of the video response with a threshold value.

6. The method of claim 1, wherein the analysis further comprises analysis of keywords or a text transcript of the video response.

7. The method of claim 1, further comprising comparing the time duration of the video response with a threshold value, wherein the time duration is less than the threshold value, and wherein the automatically selected video prompt relates to a previous video prompt.

8. A server computing device configured to conduct a video interview by performing actions comprising:
   performing analysis of a video response recorded at a client computing device in an asynchronous video interview, wherein the analysis comprises determining a time duration of the video response; and
   based on the time duration of the video response, automatically selecting a video prompt to be displayed at the client computing device as part of the asynchronous video interview.

9. The server computing device of claim 8, wherein the actions further comprise comparing the time duration of the video response with a threshold value.

10. The server computing device of claim 8, wherein the analysis further comprises analysis of keywords or a text transcript of the video response.

11. The server computing device of claim 8, wherein the actions further comprise comparing the time duration of the video response with a threshold value, wherein the time duration is less than the threshold value, and wherein the automatically selected video prompt relates to a previous video prompt.

12. The server computing device of claim 8, wherein the actions further comprise:
   transmitting a video prompt to be displayed as part of an asynchronous video interview in an interviewee user interface presented at a client computing device; and
   transmitting an information supplement as part of the asynchronous video interview to be presented at the client computing device, wherein the information supplement relates to content of the video prompt;
   wherein the video response is responsive to the video prompt and responsive to the information supplement.

13. The server computing device of claim 12, wherein the information supplement comprises an information form, the actions further comprising receiving data corresponding to user input in the information form.

14. The server computing device of claim 12, wherein the information supplement comprises at least one of a news item and a document.

15. A nontransitory computer-readable medium having computer-executable instructions stored thereon that, in response to execution by one or more processors of a computing device, cause the computing device to perform actions for conducting a video interview, the actions comprising:
   performing analysis of a video response recorded at a client computing device in an asynchronous video interview, wherein the analysis comprises determining a time duration of the video response; and
   based on the time duration of the video response, automatically selecting a video prompt to be displayed at the client computing device as part of the asynchronous video interview.

16. The computer-readable medium of claim 15, wherein the actions further comprise comparing the time duration of the video response with a threshold value.

17. The computer-readable medium of claim 15, wherein the analysis further comprises analysis of keywords or a text transcript of the video response.

18. The computer-readable medium of claim 15, wherein the actions further comprise comparing the time duration of the video response with a threshold value, wherein the time duration is less than the threshold value, and wherein the automatically selected video prompt relates to a previous video prompt.

19. The computer-readable medium of claim 15, wherein the actions further comprise:
   transmitting a video prompt to be displayed as part of an asynchronous video interview in an interviewee user interface presented at a client computing device; and
   transmitting an information supplement as part of the asynchronous video interview to be presented at the client computing device, wherein the information supplement relates to content of the video prompt and comprises at least one of a news item, a document, and an information form;
   wherein the video response is responsive to the video prompt and responsive to the information supplement.

20. The computer-readable medium of claim 19, wherein the information supplement comprises an information form, the actions further comprising receiving data corresponding to user input in the information form.

* * * * *